US010066698B2

(12) United States Patent
Kaneko et al.

(10) Patent No.: US 10,066,698 B2
(45) Date of Patent: Sep. 4, 2018

(54) RESILIENT STOPPER COMPONENT AND ANTI-VIBRATION APPARATUS

(71) Applicant: BRIDGESTONE CORPORATION, Chuo-ku, Tokyo (JP)

(72) Inventors: Akinori Kaneko, Tokyo (JP); Toshiyasu Yoshida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/111,818

(22) PCT Filed: Mar. 10, 2015

(86) PCT No.: PCT/JP2015/057013
§ 371 (c)(1),
(2) Date: Jul. 15, 2016

(87) PCT Pub. No.: WO2015/166716
PCT Pub. Date: Nov. 5, 2015

(65) Prior Publication Data
US 2016/0341275 A1    Nov. 24, 2016

(30) Foreign Application Priority Data

Apr. 28, 2014    (JP) .................................. 2014-092708

(51) Int. Cl.
*F16F 15/08*    (2006.01)
*F16F 1/38*    (2006.01)
(Continued)

(52) U.S. Cl.
CPC ............ *F16F 15/08* (2013.01); *B60K 5/1208* (2013.01); *F16F 1/3828* (2013.01);
(Continued)

(58) Field of Classification Search
CPC ........ F16F 13/10; F16F 13/101; F16F 13/102; F16F 1/373; F16F 13/106; F16F 13/108;
(Continued)

(56) References Cited

U.S. PATENT DOCUMENTS

| 2,883,132 A | * | 4/1959 | Neher | ........................ F16F 1/38 |
| | | | | 248/563 |
| 3,366,356 A | * | 1/1968 | Fisher | ........................ F16B 9/02 |
| | | | | 16/2.1 |

(Continued)

FOREIGN PATENT DOCUMENTS

| CN | 101392811 A | 3/2009 |
| CN | 201973167 U | 9/2011 |

(Continued)

OTHER PUBLICATIONS

Search Report of the First Chinese Office Action dated Apr. 5, 2017.

(Continued)

*Primary Examiner* — Jonathan Liu
*Assistant Examiner* — Taylor L Morris
(74) *Attorney, Agent, or Firm* — Solaris Intellectual Property Group, PLLC

(57) ABSTRACT

A resilient stopper component (20) is provided with a bottom surface portion (48) that is mounted, via an inner bracket (22), at one of a vibration-generating portion or a vibration-receiving portion, and that has a communicating hole (48A) provided in a first mounting component (11) that is provided with a cylindrical component (24) inside which the inner bracket (22) is inserted, with the cylindrical component (24) being inserted through the communicating hole (48A), is also provided with an enclosing portion (50) that is formed extending upright from the bottom surface portion (48) so as to be able to enclose the cylindrical component (24), in which an aperture portion (58) that forms (Continued)

an aperture for inserting the inner bracket (22) into the cylindrical component (24) is formed so as to be in communication with the communicating hole (48A), and limits a displacement amount of the first mounting component (11).

8 Claims, 7 Drawing Sheets

(51) Int. Cl.
  *B60K 5/12* (2006.01)
  *F16F 13/10* (2006.01)
  *F16F 1/373* (2006.01)

(52) U.S. Cl.
  CPC ........ *F16F 1/3842* (2013.01); *B60G 2204/41* (2013.01); *F16F 1/373* (2013.01); *F16F 1/3849* (2013.01); *F16F 13/10* (2013.01)

(58) Field of Classification Search
  CPC .. F16F 15/08; F16F 1/38; F16F 1/3849; F16F 1/3856; F16F 1/3863; F16F 1/3828; B60K 5/1208; B60K 5/12; B60G 2204/41
  USPC ............... 248/560, 563, 573, 603, 604, 618; 267/136, 140.11, 140.12, 140.13, 141, 267/141.2
  See application file for complete search history.

(56) References Cited

U.S. PATENT DOCUMENTS

| | | | | |
|---|---|---|---|---|
| 4,768,611 A * | 9/1988 | Schmitt | F16F 1/54 | 180/300 |
| 4,921,049 A * | 5/1990 | Kaiser | F16F 13/10 | 267/140.13 |
| 5,775,666 A * | 7/1998 | Tsukamoto | F16F 13/10 | 267/140.13 |
| 5,878,494 A * | 3/1999 | Hamaekers | B23P 15/00 | 29/896.93 |
| 5,961,219 A * | 10/1999 | Maughan | F16F 1/38 | 384/220 |
| 5,964,456 A * | 10/1999 | Someya | F16F 13/10 | 267/140.13 |
| 6,019,342 A * | 2/2000 | Pelle | F16F 1/3835 | 248/560 |
| 6,123,352 A * | 9/2000 | Muzio | B60G 21/0551 | 280/124.152 |
| 6,296,237 B1 * | 10/2001 | Nagai | B60G 7/04 | 267/140 |
| 6,341,766 B1 * | 1/2002 | Stiller | F16F 13/18 | 267/140.13 |
| 6,409,158 B1 * | 6/2002 | Takashima | F16F 13/101 | 267/140.13 |
| 6,443,438 B2 * | 9/2002 | Satori | F16F 13/105 | 267/140.13 |
| 6,808,167 B2 * | 10/2004 | Kodama | F16F 13/101 | 267/140.13 |
| 7,055,811 B2 * | 6/2006 | Ihara | F16F 1/373 | 267/140.13 |
| 7,065,875 B2 * | 6/2006 | Cai | B60G 21/0551 | 219/156 |
| 7,837,184 B2 * | 11/2010 | Miyahara | F16F 7/12 | 267/140.13 |
| 8,403,097 B2 * | 3/2013 | Joly | F16F 1/373 | 180/291 |
| 2003/0080482 A1 * | 5/2003 | Desmoulins | F16F 13/106 | 267/140.13 |
| 2004/0113339 A1 * | 6/2004 | Masterson | F16F 1/3732 | 267/153 |
| 2004/0201150 A1 * | 10/2004 | Okanaka | F16F 13/101 | 267/140.11 |
| 2005/0206055 A1 * | 9/2005 | Nemoto | F16F 13/10 | 267/140.11 |
| 2005/0242481 A1 | 11/2005 | Ihara et al. | | |
| 2006/0083585 A1 * | 4/2006 | Lew | B62D 21/155 | 403/365 |
| 2006/0157633 A1 * | 7/2006 | Bellamy | B29C 45/14467 | 248/562 |
| 2007/0178258 A1 * | 8/2007 | Petit | F16F 13/10 | 428/34.1 |
| 2008/0196987 A1 * | 8/2008 | Niwa | F16F 1/3828 | 188/379 |
| 2009/0079116 A1 * | 3/2009 | Yoshii | B60K 5/1291 | 267/140.13 |
| 2010/0059912 A1 * | 3/2010 | Takakura | F16F 1/3849 | 267/140.12 |
| 2011/0031663 A1 * | 2/2011 | Matsuda | F16F 13/105 | 267/140.13 |
| 2012/0126091 A1 * | 5/2012 | Kleindorfer | B60K 13/04 | 248/674 |
| 2012/0267184 A1 * | 10/2012 | Joly | F16F 1/373 | 180/291 |
| 2012/0318951 A1 * | 12/2012 | Hermann | F16F 13/103 | 248/565 |
| 2012/0326369 A1 * | 12/2012 | Kawachi | B60K 15/067 | 267/141.4 |
| 2013/0028547 A1 * | 1/2013 | Jang | B60G 21/0551 | 384/215 |
| 2013/0175744 A1 * | 7/2013 | Goshima | F16F 13/108 | 267/140.13 |
| 2013/0320181 A1 * | 12/2013 | Kamei | B60K 5/1241 | 248/548 |
| 2014/0367546 A1 * | 12/2014 | Hibi | F16F 15/08 | 248/635 |
| 2014/0367547 A1 * | 12/2014 | Ohnishi | F16F 1/36 | 248/638 |
| 2016/0226335 A1 * | 8/2016 | Nicoloff | F16F 1/3835 | |

FOREIGN PATENT DOCUMENTS

| | | | | |
|---|---|---|---|---|
| CN | 202608559 U | 12/2012 | | |
| JP | 2007-326523 A | 12/2007 | | |
| JP | 2009-196512 A | 9/2009 | | |
| JP | 2012-002328 A | 1/2012 | | |
| JP | WO 2012033052 A1 * | 3/2012 | ............ | F16F 13/108 |

OTHER PUBLICATIONS

Search Report of the Chinese office action dated Sep. 29, 2017, from the SIPO in a Chinese patent application corresponding to the instant patent application.

Search Report of the Chinese office action dated Mar. 30, 2018, from the SIPO in a Chinese patent application corresponding to the instant patent application.

* cited by examiner

RESILIENT STOPPER COMPONENT AND ANTI-VIBRATION APPARATUS

TECHNICAL FIELD

The present invention relates to an anti-vibration apparatus that is used when a vibration-generating portion such as, for example, an automobile engine or the like is mounted on a vibration-receiving portion such as a vehicle body, and to a resilient stopper component that is used in this anti-vibration apparatus.

BACKGROUND ART

In Japanese Patent Application Laid-Open (JP-A) No. 2012-2328 a structure is disclosed in which stopper rubber (i.e., a resilient stopper component) is used to cover an engine-side inner bracket, and this is then fixed to a first mounting component by bolts.

SUMMARY OF THE INVENTION

Technical Problem

If, as in the aforementioned conventional example, the first mounting component and the resilient stopper are formed as mutually separate components, then it becomes possible to fine-tune a variety of the anti-vibration apparatus characteristics by changing the type of resilient stopper component.

It is, however, necessary for any shifting that is generated between the first mounting component and the resilient stopper component by an input from the vibration-generating portion to be suppressed. One method that might be considered instead of using bolts for the fixing is to cover the inner bracket with stopper rubber, and then press-insert the inner bracket into the mounting component, however, this press-insertion is actually quite difficult. The reason for this is that if the structure of the resilient stopper component is altered too much in order to make the press-insertion easier, then it becomes difficult to satisfy the characteristics that are required in the resilient stopper component.

It is an object of the present invention to make it possible to easily manufacture a type of anti-vibration apparatus in which an inner bracket is press-inserted into a first mounting component.

Solution to the Problem

A resilient stopper component according to a first aspect has a bottom surface portion that has a communicating hole inside which a cylindrical component of a first mounting component is inserted through, the first mounting component is mounted, via an inner bracket, at one of a vibration-generating portion or a vibration-receiving portion, and the inner bracket is inserted inside the cylindrical component, and has an enclosing portion that is formed extending upright from the bottom surface portion so as to be able to enclose the cylindrical component, and in which an aperture portion that forms an aperture for inserting the inner bracket into the cylindrical component is formed so as to be in communication with the communicating hole. This resilient stopper component limits a displacement amount of the first mounting component.

In this resilient stopper component, when the cylindrical component of the first mounting component is inserted into the communicating hole in the bottom surface portion, the cylindrical component is enclosed by the enclosing portion. As a result, the resilient stopper component is mounted onto the cylindrical component. Because the aperture portion is provided in the resilient stopper component, the inner bracket can be easily fitted inside the cylindrical component through this aperture portion. Consequently, it is possible for a type of anti-vibration apparatus in which the inner bracket is press-inserted into the cylindrical component of the first mounting component to be manufactured easily.

A second aspect is characterized in that, in the resilient stopper component according to the first aspect, deformation assisting portions are formed at a circumferential edge of the communicating hole.

In this resilient stopper component, because deformation assisting portions are formed at a circumferential edge of the communicating hole, when the cylindrical component is inserted into the communicating hole and is covered by the resilient stopper component, it is easy for the communicating hole to be elastically stretched wider. Because of this, the resilient stopper component can be easily mounted on the cylindrical component.

A third aspect is characterized in that, in the resilient stopper component according to the second aspect, the deformation assisting portions are notches that open onto the communicating hole.

In this resilient stopper component, because the deformation assisting portions are notches that open onto the communicating hole, when the cylindrical component is inserted into the communicating hole and is covered by the resilient stopper component, it is easy for the communicating hole to be elastically stretched wider. Because of this, the resilient stopper component can be even more easily mounted on the cylindrical component.

A fourth aspect is an anti-vibration apparatus having the resilient stopper component according to any one of the first through third aspects, in which the first mounting component is mounted, via an inner bracket, at one of a vibration-generating portion or a vibration-receiving portion, and is provided with a cylindrical component inside which the inner bracket is inserted, a second mounting component that is mounted, via an outer bracket, at the other one of the vibration-generating portion or the vibration-receiving portion, and a rubber resilient body that elastically joins together the first mounting component and the second mounting component, wherein the resilient stopper component is interposed between the cylindrical component and the outer bracket, and limits an amount of displacement of the first mounting component relative to the outer bracket.

In this anti-vibration apparatus, the cylindrical component is covered by the resilient stopper component, and the inner bracket can be fitted inside the cylindrical component through the aperture portion in the resilient stopper component. As a consequence, it is possible for a type of anti-vibration apparatus in which the inner bracket is press-inserted into the cylindrical component of the first mounting component to be manufactured easily.

A fifth aspect is characterized in that, in the anti-vibration apparatus according to the fourth aspect, when viewed from an axial direction of the communicating hole, the cylindrical component is larger than the communicating hole.

In this anti-vibration apparatus, because the cylindrical component is larger than the communicating hole in the bottom portion of the resilient stopper component when viewed from the axial direction of the communicating hole, it is difficult for the resilient stopper component to come loose from the cylindrical component. Because of this, the stability of the mounting of the resilient stopper component onto the cylindrical component is increased.

Advantageous Effects of the Invention

According to the anti-vibration apparatus of the present invention, the superior effect is achieved that it is possible to easily manufacture a type of anti-vibration apparatus in which an inner bracket is press-inserted into a first mounting component.

DESCRIPTION OF THE EMBODIMENTS

Figure 1:
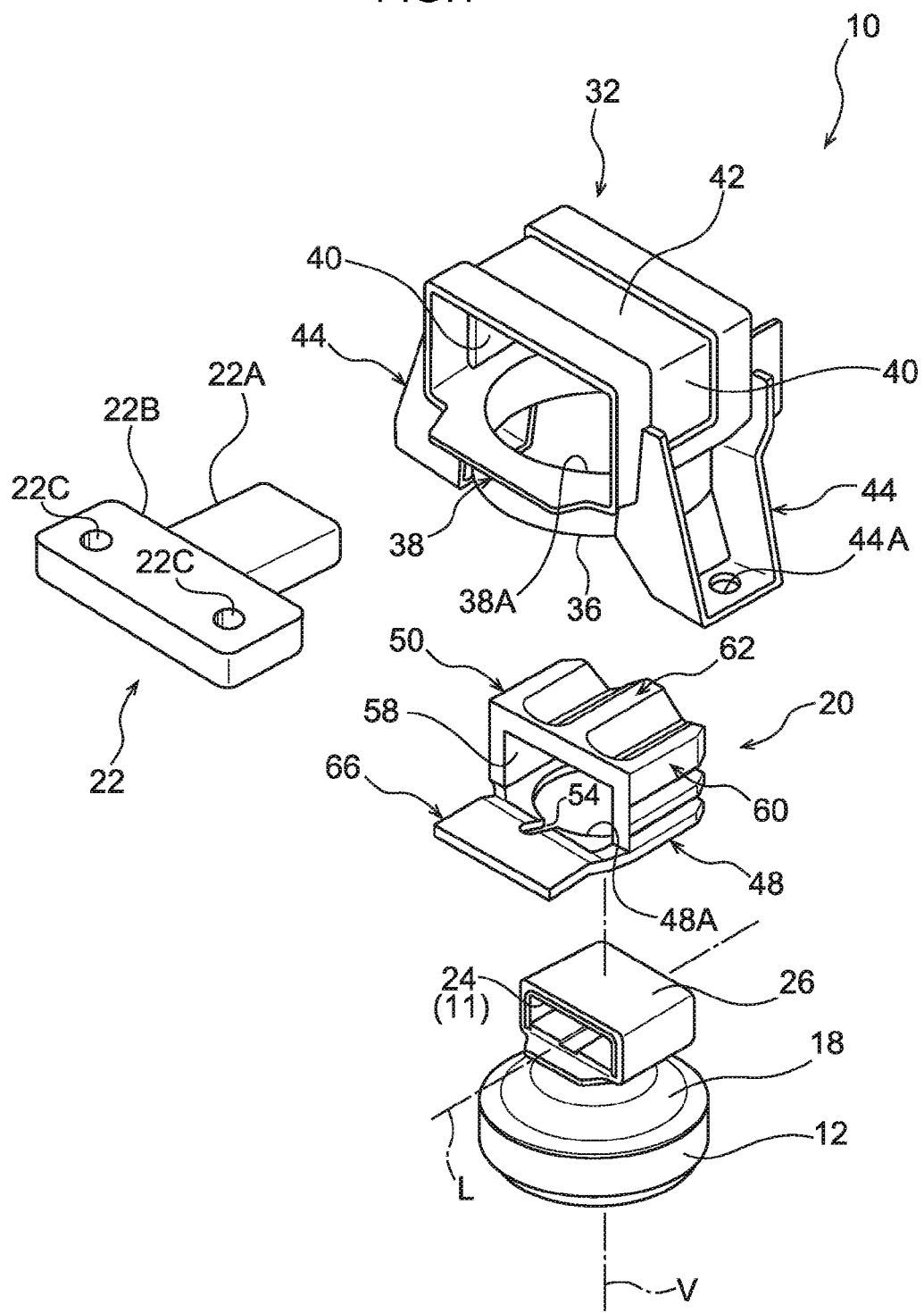
FIG. 1 is an exploded perspective view showing an anti-vibration apparatus according to the present embodiment.

Hereinafter, embodiments for implementing the present invention will be described based on the drawings. In FIG. 1, an anti-vibration apparatus 10 according to the present embodiment is used when a vibration-generating portion 14 (see FIG. 5) such as, for example, an automobile engine or the like is mounted on a vibration-receiving portion 16 (see FIG. 5) such as a vehicle body or the like. This anti-vibration apparatus 10 has a first mounting component 11, a second mounting component 12, a rubber resilient body 18, and a resilient stopper component 20.

The first mounting component 11 is mounted via an inner bracket 22 on either the vibration-generating portion 14 or the vibration-receiving portion 16, for example, on the vibration-generating portion 14. A receptacle component 24 inside which the inner bracket 22 is inserted is provided in the first mounting component 11. The receptacle component 24 is also referred to herein as cylindrical component 24. This first mounting component 11 is made using a metal material. A bottom portion of the first mounting component 11 is embedded in the rubber resilient body 18. The cylindrical component 24 is provided in a top portion of the first mounting component 11 and the cylindrical component 24 is formed as a receptacle having a quadrilateral cross-section, which can be seen, for example, in FIGS. 1, 2, 3 and 5. An external surface of the cylindrical component 24 is covered by a rubber resilient body 26.

The inner bracket 22 has an insertion portion 22A and a mounting portion 22B. The insertion portion 22A is inserted into the cylindrical component 24. When the insertion portion 22A is fitted inside the cylindrical component 24, the mounting portion 22B is positioned on the outside of this cylindrical component 24. A plurality of through holes 22C are formed in the mounting portion 22B. Bolts or the like (not shown) that are used to fasten the inner bracket 22 to the vibration-generating portion 14 are inserted through the through holes 22C.

The second mounting component 12 is mounted, via an outer bracket 32, at the other one of the vibration-generating portion 14 or the vibration-receiving portion 16, for example, on the vibration-receiving portion 16. The second mounting component 12 is, for example, a substantially circular cylinder-shaped metal component, and a bottom end portion thereof narrows down in a tapered shape. The second mounting component 12 is inserted from underneath into a circular cylinder portion 36 of the outer bracket 32 (see FIG. 5). The axial direction of the second mounting component 12 (i.e., the direction shown by the arrow V) is substantially orthogonal to the axial direction of the cylindrical component 24 (i.e., the direction shown by the arrow L). As an example, when the anti-vibration apparatus 10 has been mounted in an automobile, the axial direction of the second mounting component 12 extends in a vertical direction, while the axial direction of the cylindrical component 24 extends in a horizontal direction.

Figure 5:
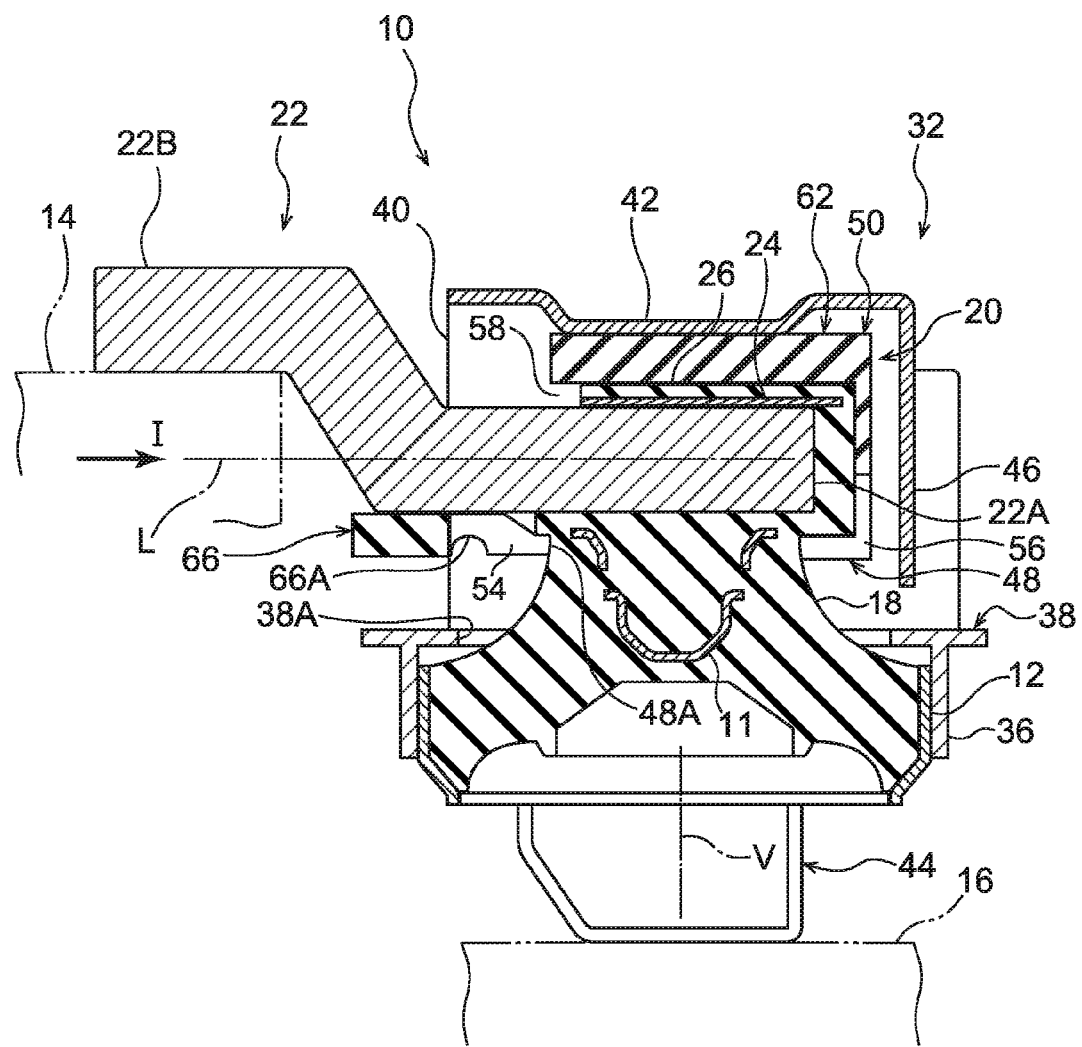
FIG. 5 is a cross-sectional view showing an anti-vibration apparatus according to the present embodiment.

In FIG. 5, the rubber resilient body 18 is a component that elastically joins together the first mounting component 11 and the second mounting component 12. The first mounting component 11 is positioned above the second mounting component 12, and the rubber resilient body 18 is positioned between these two. A bottom end portion of the rubber resilient body 18 is adhered to an inner circumferential surface of the second mounting component 12. The rubber resilient body 18 and the rubber resilient body 26 that covers the external surface of the cylindrical component 24 may, for example, be integrally molded as a single body.

In FIG. 1, a plate-shaped portion 38 is provided at a top end of the circular cylinder portion 36 in the outer bracket 32. A through hole 38A that is coaxial with the circular cylinder portion 36 is formed in the plate-shaped portion 38. As is shown in FIG. 5, a gap is formed between a circumferential edge of the through hole 38A and the rubber resilient body 26. This gap is designed to prevent the rubber resilient body 26 from coming into contact with the circumferential edge of the through hole 38A during a deformation of the rubber resilient body 26.

A pair of side wall portions 40 are provided extending upwards from the plate-shaped portion 38 on outer sides in a radial direction of the through hole 38A. Top edges of the side wall portions 40 are mutually joined together by a top wall portion 42. Leg portions 44 are provided respectively on each of the pair of side wall portions 40. These leg portions 44 are mounting portions for mounting onto the vibration-receiving portion 16, and are provided with through holes 44A. Bolts or the like (not shown) that are used to fasten the leg portions onto the vibration-receiving portion 16 are inserted through the through holes 44A. As is shown in FIG. 5, a portion enclosed by the side wall portions 40, the top wall portion 42, and the plate-shaped portion 38 is opened in the outer bracket 32 on the side thereof from which the inner bracket 22 is inserted (i.e., the front side in FIG. 5). In contrast, a rear wall portion 46 that is continuous with the top wall portion 42 is provided at the opposite side of the outer bracket 32 from the inner bracket 22 insertion side. Consequently, the distance that the cylindrical component 24 can be displaced towards the rear wall portion 46 side is limited.

In FIG. 1, FIG. 5, and FIG. 6, the resilient stopper component 20 is interposed between the cylindrical component 24 and the outer bracket 32, and limits the amount of displacement of the first mounting component 11 relative to the outer bracket 32. The resilient stopper component 20 has a bottom surface portion 48 and an enclosing portion 50, and is formed using a resilient body made of rubber or the like. As is shown in FIGS. 6A through 6C, the bottom surface portion 48 has, for example, a circular communicating hole 48A that is used to insert the cylindrical component 24 of the first mounting component 11 into the interior of the resilient stopper component 20. When viewed from the axial direction of the communicating hole 48A, the cylindrical component 24 is larger than the communicating hole 48A. Specifically, the maximum dimensions of the cylindrical component 24 when seen in plan view are larger than the diameter d (see FIG. 6C) of the communicating hole 48A. The maximum dimension is the largest dimension out of the longitudinal dimension, the transverse dimension, and the length of the diagonal lines and the like. Notches 54 and 56 that serve as examples of deformation assisting portions are formed in a circumferential edge of the communicating hole 48A. These notches 54 and 56 each open onto the communicating hole 48A and enable the bottom surface portion 48 to be deformed in a direction that enlarges the internal diameter of the communicating hole 48A.

The enclosing portion 50 is formed extending upwards from the bottom surface portion 48 so as to be able to enclose the cylindrical component 24, and an aperture portion 58 is formed so as to communicate with the communicating hole 48A. The aperture portion 58 forms an insertion aperture for the inner bracket 22 to be inserted into the cylindrical component 24. The enclosing portion 50 has a pair of side wall portions 60, a top wall portion 62, and a rear wall portion 64. The side wall portions 60 extend upright from the bottom surface portion 48 on outer sides in a radial direction of the communicating hole 48A. The top wall portion 62 joins together top edges of the pair of side wall portions 60. The rear wall portion 64 stands upright on the opposite side from the aperture portion 58. Grooves 60A and 62A that extend, for example, in the insertion direction (i.e., in the direction shown by an arrow I) of the inner bracket 22 (see FIG. 1) are formed on exterior sides of the side wall portions 60 and the top wall portion 62. When the resilient stopper portion 20 is assembled together with the cylindrical component 24, the side wall portions 60, the top wall portion 62, and the rear wall portion 64 are tight against the resilient body 26 that covers the cylindrical component 24. Namely, the resilient stopper component 20 is assembled in tight contact with the cylindrical portion 24.

A projecting portion 66 that protrudes in the opposite direction from the direction in which the inner bracket 22 is inserted into the aperture 58 is provided integrally with an end portion on the aperture portion 58 side of the bottom surface portion 48. This projecting portion 66 is an extension of the bottom surface portion 48, and is formed to a greater thickness than the bottom surface portion 48. A groove 66A that extends in the transverse direction of the aperture portion 58 is formed in a bottom surface of the projecting portion 66. As is shown in FIG. 6D, the projecting portion 66 can be folded elastically around a base portion 66B in the direction shown by an arrow U.

Figure 6A:
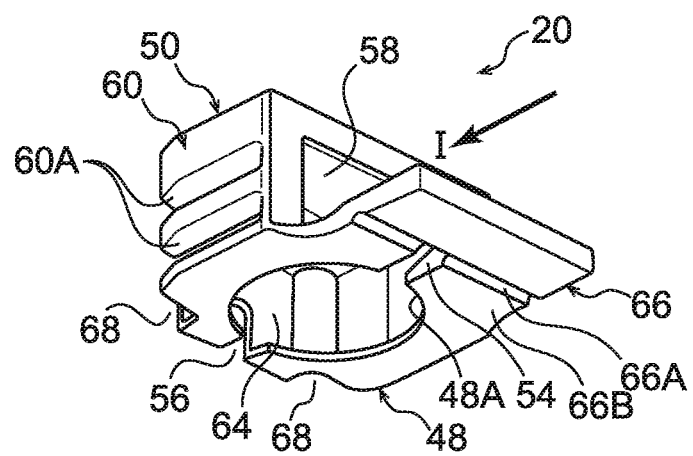
FIG. 6A is a perspective view showing a resilient stopper component as seen from below.
Figure 6B:
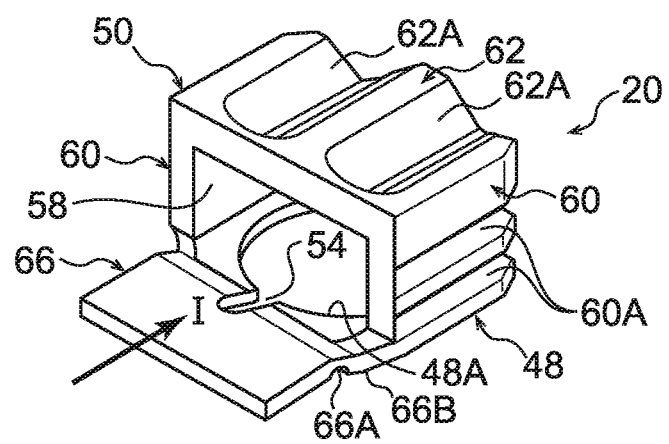
FIG. 6B is a perspective view showing a resilient stopper component as seen from above.
Figure 6C:
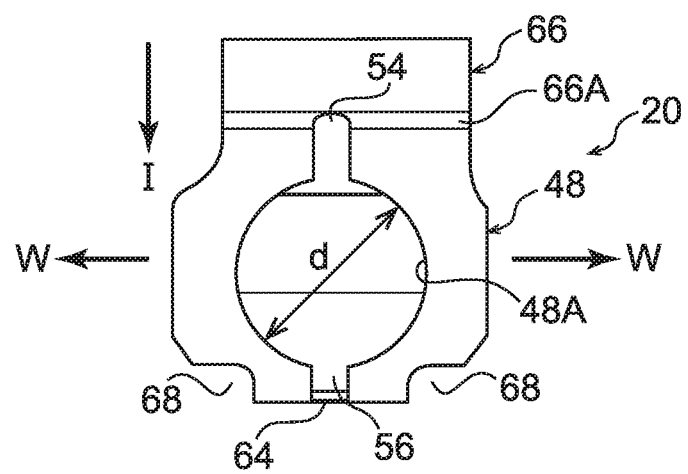
FIG. 6C is a bottom view showing a resilient stopper component.
Figure 6D:
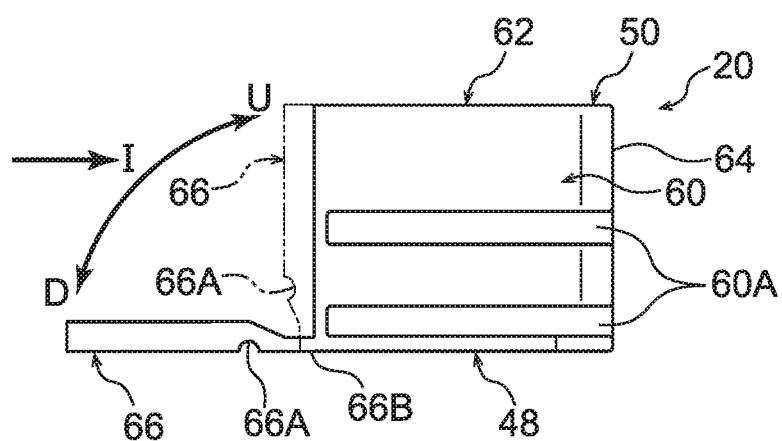
FIG. 6D is a side view showing a resilient stopper component.

As is shown in FIGS. 6A and 6C, the notch 54 extends from the groove 66A in the projecting portion 66 towards the center of the communicating hole 48A, and opens onto the communicating hole 48A. The direction in which the notch 56 is formed passes from the rear wall portion 64 of the enclosing portion 50 through the bottom surface portion 48, and extends towards the center of the communicating hole 48A. The notch 56 also opens onto the communicating hole 48A. As is shown in FIG. 6C, the notches 54 and 56 are arranged in parallel with the insertion direction (i.e., the direction shown by the arrow I) of the inner bracket 22 (see FIG. 1), and are located on a straight line that passes through the center of the communicating hole 48A. This is so that, when the cylindrical component 24 is being inserted through the communicating hole 48A, the bottom surface portion 48 can be easily opened up in the directions shown by the arrows W so as to widen the gap between the side wall portions 60.

As is shown in FIG. 6C, notches 68 are also provided respectively in corner portions on the rear wall portion 64 side of the resilient stopper portion 20. These notches 68 are formed extending for the entire height direction of the resilient stopper component 20. The notches 68 reduce the rigidity of the corner portions of the enclosing portion 50, so that it is easier for the resilient stopper component 20 to be deformed. Accordingly, an operation to cover the cylindrical component 24 of the first mounting component 11 with the resilient stopper component 20 can be performed easily.

(Operation)

Figure 2:
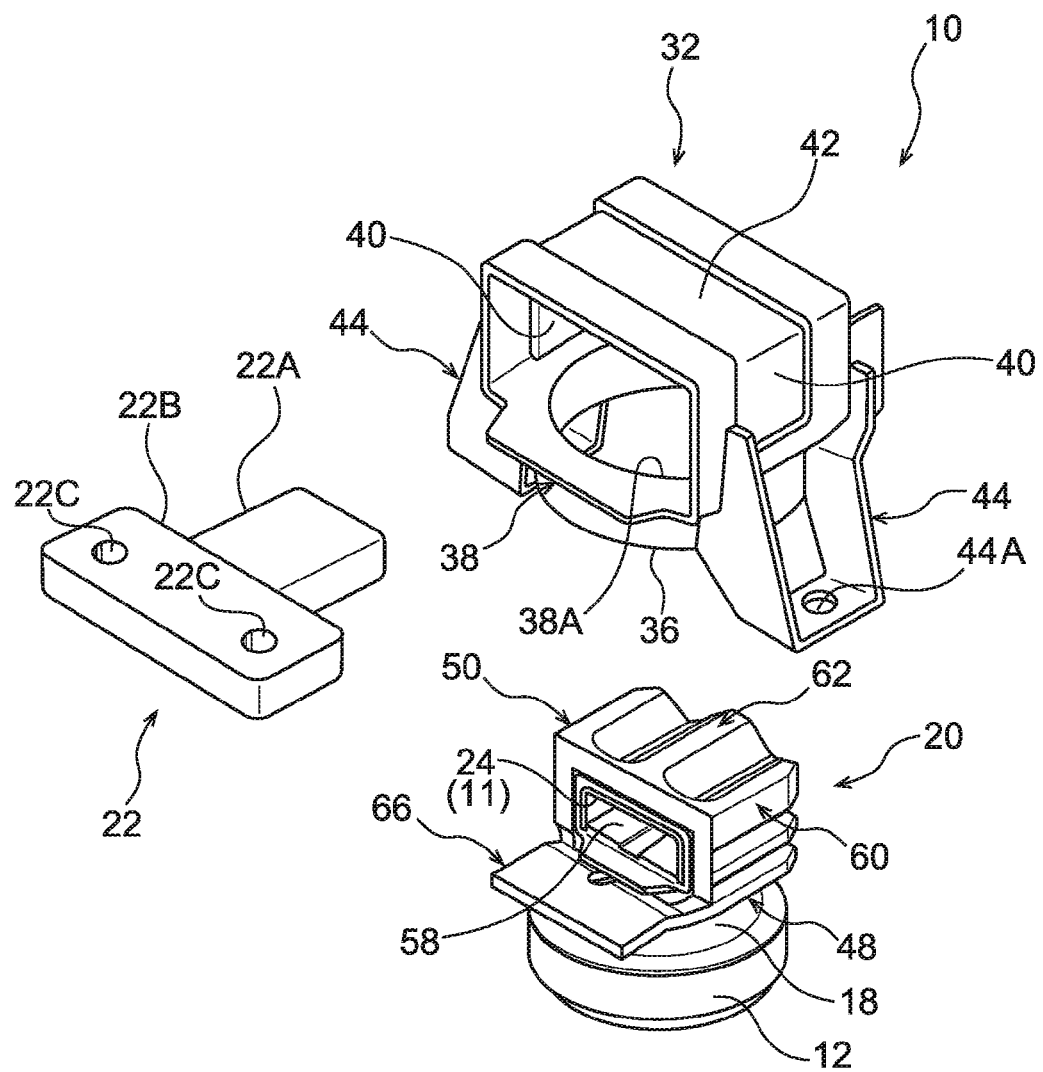
FIG. 2 is an exploded perspective view showing a state in which a resilient stopper component is covering a cylindrical component in the anti-vibration apparatus according to the present embodiment.

The structure of the present embodiment has been described above, and an operation thereof will now be described. The anti-vibration apparatus 10 according to the present embodiment may be assembled, for example, in the following manner. Firstly, as is shown in FIG. 1 and FIG. 2, the cylindrical component 24 is covered by the resilient stopper component 20. Specifically, the bottom surface portion 48 is deformed in direction that causes the internal diameter of the communicating hole 48A in the bottom surface portion 48 of the resilient stopper 20 to be enlarged, and the cylindrical component 24 of the first mounting component 11 is then inserted into the communicating hole 48A. As a result, the cylindrical component 24 is placed inside the enclosing portion 50 of the resilient stopper portion 20, and is enclosed by this enclosing portion 50. The side wall portions 60, the top wall portion 62, and the rear wall portion 64 of the resilient stopper portion 20 are in close contact with the resilient body 26 covering the cylindrical component 24. As a result, the resilient stopper component 20 and the cylindrical component 24 are assembled together in a state of tight contact with each other.

Because the notches 54 and 56 are formed as deformation assisting portions in the circumferential edge of the communicating hole 48A, when the cylindrical component 24 is inserted into the communicating hole 48A and is covered by the resilient stopper component 20, it is easy for the communicating hole 48A to be elastically stretched wider. Because of this, the resilient stopper component 20 can be easily mounted onto the cylindrical component 24.

Moreover, because the cylindrical component 24 is larger than the communicating hole 48A when viewed from the axial direction of the communicating hole 48A in the bottom portion of the resilient stopper component 20, it is difficult for the resilient stopper component 20 to come loose from the cylindrical component 24. Because of this, the stability of the mounting of the resilient stopper component 20 onto the cylindrical component 24 is increased.

Figure 3:
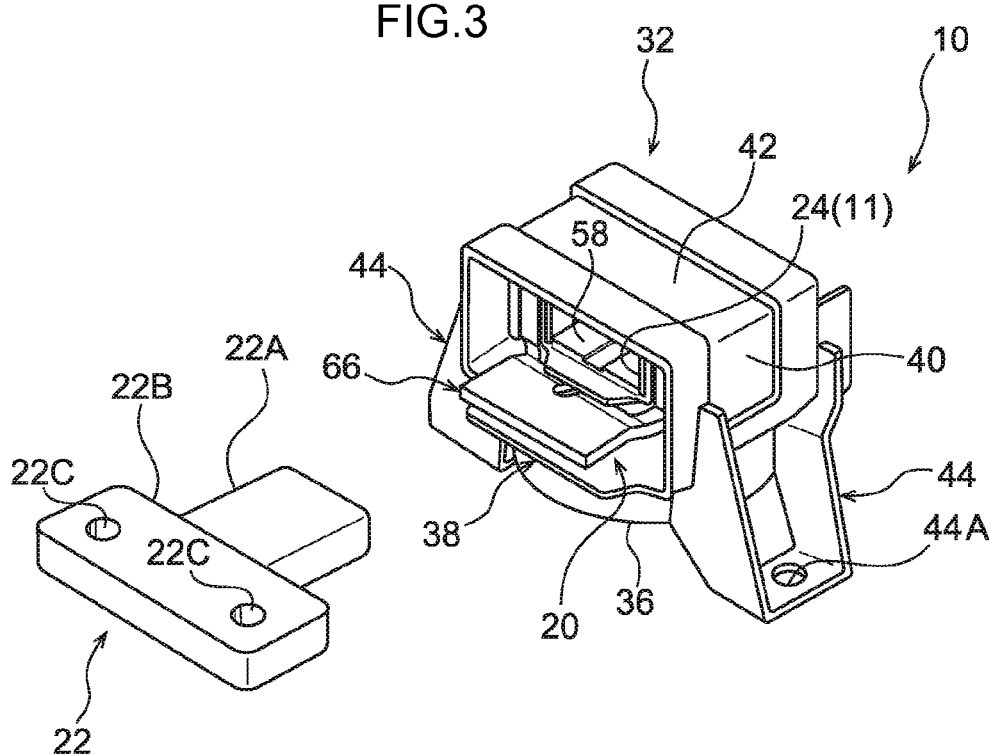
FIG. 3 is an exploded perspective view showing a state in which a second mounting component has been mounted on an outer bracket in the anti-vibration apparatus according to the present embodiment.

Next, as is shown in FIG. 2 and FIG. 3, the second mounting portion 12 and the outer bracket 32 are assembled together. Specifically, the cylindrical component 24 which is covered by the resilient stopper component 20 is inserted from underneath into the through hole 38A in the plate-shaped portion 38 of the outer bracket 32, and the second mounting component 12 is press-inserted into the circular cylinder portion 36.

This task is performed while the projecting portion 66 is elastically folded in the direction shown by the arrow U (see FIG. 6D), and this prevents the projecting portion 66 from obstructing the press-insertion task. After the cylindrical component 24 which is covered by the resilient stopper component 20 has been inserted into the through hole 38A, the projecting portion 66 is released from its folded state so that the projecting portion 66 is moved downwards by its own resilience in the direction shown by the arrow D (see FIG. 6D) and is unfolded again above the plate-shaped portion 38 (see FIG. 3 and FIG. 5). Contact between the inner bracket 22 and the plate-shaped portion 38 is suppressed by the projecting portion 66.

Figure 4:
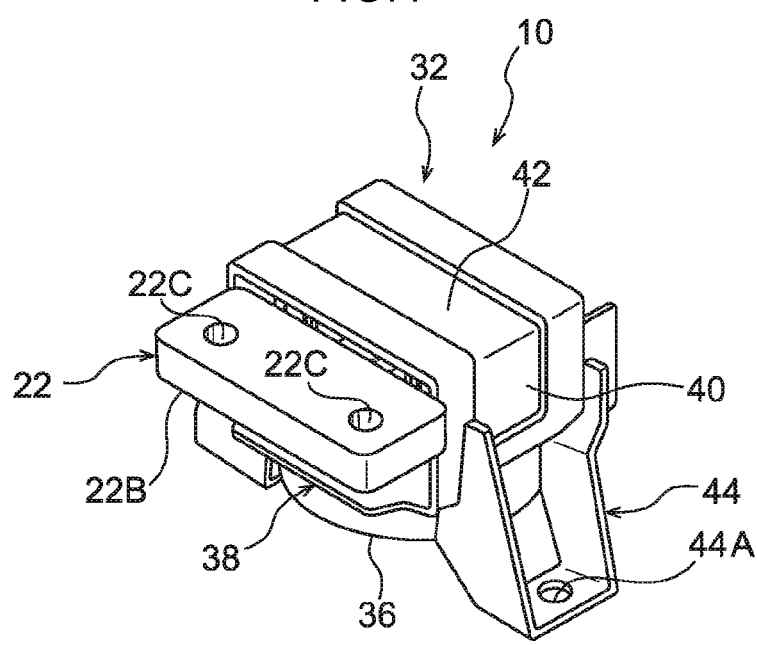
FIG. 4 is an exploded perspective view showing a state in which an inner bracket has been fitted inside a cylindrical component of a first mounting component in the anti-vibration apparatus according to the present embodiment.

Next, in FIG. 3 and FIG. 4, the inner bracket 22 is inserted into the cylindrical component 24. Because the aperture portion 58 is provided in the resilient stopper component 20, the inner bracket 22 can be easily fitted inside the cylindrical component 24 through the aperture portion 58. In this manner, according to the present embodiment, it is possible to easily manufacture a type of anti-vibration apparatus 10 in which the inner bracket 22 is press-inserted into the cylindrical component 24 of the first mounting component 11.

Additional Embodiment

An example of an embodiment of the present invention has been described and illustrated above, however, embodiments of the present invention are not limited to this example. Additions, omissions, substitutions, and other modifications may be made insofar as they do not depart from the spirit or scope of the present invention.

Figure 7A:
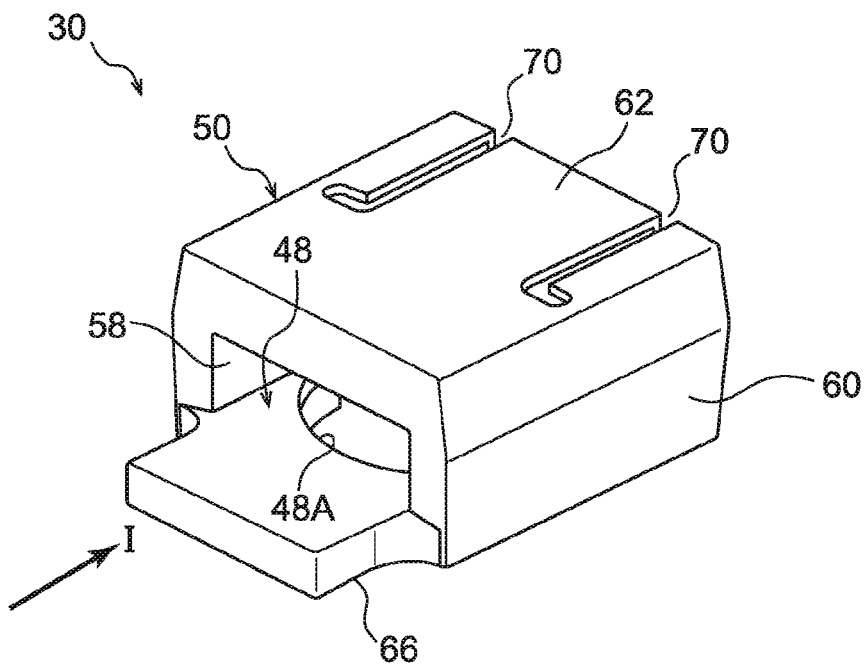
FIG. 7A is a perspective view showing a resilient stopper component according to another embodiment as seen from above.
Figure 7B:
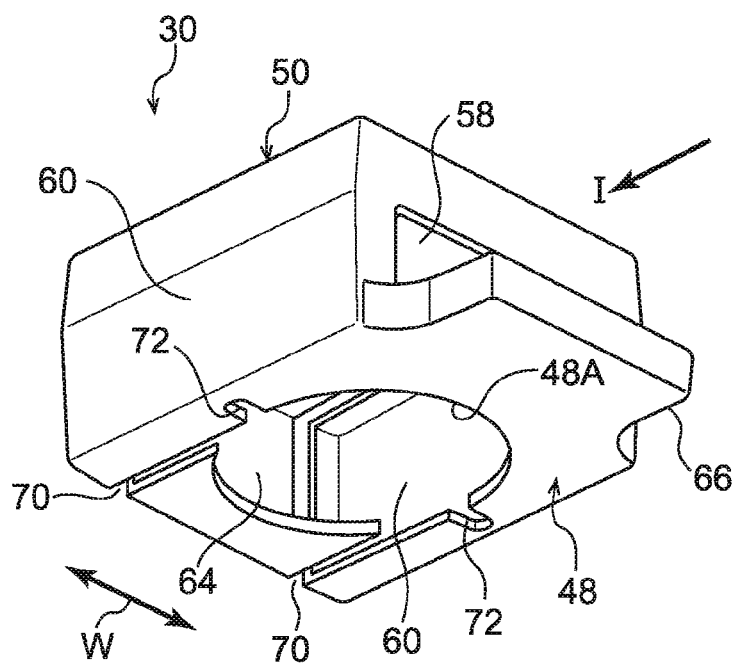
FIG. 7B is a perspective view showing a resilient stopper component according to another embodiment as seen from below.

A resilient stopper 30 according to another embodiment is shown in FIGS. 7A and 7B. In this resilient stopper component 30 are formed a pair of notches 70 that are continuous with the top wall portion 62, the rear wall portion 64, and the bottom surface portion 48 of the enclosing portion 50. The notches 70 terminate in an L-shape in the top wall portion 62, and open onto the communicating hole 48A in the bottom surface portion 48.

In addition, a pair of short notches 72 that open onto the communicating hole 48A are formed in different positions from the notches 70 in the circumferential edge of the communicating hole 48A in the bottom surface portion 48. The pair of notches 72 extend in a direction (shown by an arrow W) that is orthogonal to the insertion direction (shown by the arrow I) of the inner bracket 22 (see FIG. 1), and are located on a straight line that passes through the center of the communicating hole 48A. Namely, the pair of notches 72 are located on two sides in the radial direction of the communicating hole 48A of the direction shown by the arrow W.

By providing the notches 70 and 72, when the cylindrical component 24 is inserted through the communicating hole 48A (see FIG. 1), the bottom surface portion 48 can be easily opened in the directions of the arrow I and the arrow W.

The remaining portions are the same as in the elastic stopper 20, therefore, the same symbols are used in the drawings for these same portions and any description thereof is omitted.

Moreover, in the above-described embodiment, a deformation assisting portion is formed in the bottom surface portion 48 of the elastic stopper portion 20, however, provided that the cylindrical component 24 can be inserted through the communicating hole 48A in the bottom surface portion 48, then it is not essential for a deformation assisting portion to be formed. Furthermore, the notches 54, 56, 70, and 72 that open onto the communicating hole 48A are given as examples of deformation assisting portions, however, the deformation assisting portions are not limited to these and it is sufficient if a structure that reduces the bending rigidity of the bottom surface portion 48 is employed, such as for example, by forming thin portions or the like.

Moreover, a structure is employed above in which, when viewed from the axial direction of the communicating hole 48A, the cylindrical component 24 is larger than the communicating hole 48A, however, it is sufficient if the longitudinal direction of the cylindrical component 24 is larger than the communicating hole 48A, and the transverse direction of the cylindrical component 24 may be formed smaller than the communicating hole 48A.

Priority is claimed on Japanese Patent Application No. 2014-92708, filed Apr. 28, 2014, the disclosure of which is incorporated herein in its entirety by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. A resilient stopper component, comprising:
a bottom surface portion that has a communicating hole inside which a receptacle component of a first mounting component is inserted through, the first mounting component is mounted, via an inner bracket, at one of a vibration-generating portion or a vibration-receiving portion, and the inner bracket is inserted inside the receptacle component; and
an enclosing portion that is formed extending upright from the bottom surface portion so as to be able to enclose the receptacle component, and in which an aperture portion that forms an aperture for inserting the inner bracket into the receptacle component is formed so as to be in communication with the communicating hole,
wherein the resilient stopper component limits a displacement amount of the first mounting component;
wherein the resilient stopper component is formed using a resilient body;
wherein the enclosing portion of the resilient stopper component is assembled in tight contact with the receptacle component;
wherein the receptacle component has a polygonal cross-section;
wherein deformation assisting portions are formed at a circumferential edge of the communicating hole, and are notches that open onto the communicating hole; and
wherein the notches are arranged in parallel with a direction in which the inner bracket is inserted into the aperture portion, and are located on a straight line that passes through the center of the communicating hole.

2. The resilient stopper component according to claim 1, wherein a projecting portion that protrudes in an opposite direction from the insertion direction of the inner bracket, is provided integrally with an end portion on an aperture portion side of the bottom surface portion.

3. The resilient stopper component according to claim 2, wherein a groove that extends in a transverse direction of the aperture portion, is formed in a bottom surface of the projecting portion.

4. An anti-vibration apparatus, comprising:
   the resilient stopper component according to claim 1, in which the first mounting component is mounted, via the inner bracket, at one of the vibration-generating portion or the vibration-receiving portion, and is provided with the receptacle component inside which the inner bracket is inserted;
   a second mounting component that is mounted, via an outer bracket, at the other one of the vibration-generating portion or the vibration-receiving portion; and
   a rubber resilient body that elastically joins together the first mounting component and the second mounting component;
   wherein the resilient stopper component is interposed between the receptacle component and the outer bracket, and limits an amount of displacement of the first mounting component relative to the outer bracket.

5. The anti-vibration apparatus according to claim 4, wherein, when viewed from an axial direction of the communicating hole, the receptacle component is larger than the communicating hole.

6. A resilient stopper component, comprising:
   a bottom surface portion that has a communicating hole inside which a receptacle component of a first mounting component is inserted through, the first mounting component is mounted, via an inner bracket, at one of a vibration-generating portion or a vibration-receiving portion, and the inner bracket is inserted inside the receptacle component; and
   an enclosing portion that is formed extending upright from the bottom surface portion so as to be able to enclose the receptacle component, and in which an aperture portion that forms an aperture for inserting the inner bracket into the receptacle component is formed so as to be in communication with the communicating hole,
   wherein the resilient stopper component limits a displacement amount of the first mounting component;
   wherein the resilient stopper component is formed using a resilient body;
   wherein the enclosing portion of the resilient stopper component is assembled in tight contact with the receptacle component;
   wherein the receptacle component has a quadrilateral cross-section;
   wherein deformation assisting portions are formed at a circumferential edge of the communicating hole, and are notches that open onto the communicating hole; and
   wherein the notches are arranged in parallel with a direction in which the inner bracket is inserted into the aperture portion, and are located on a straight line that passes through the center of the communicating hole.

7. The resilient stopper component according to claim 6, wherein a projecting portion that protrudes in an opposite direction from the insertion direction of the inner bracket, is provided integrally with an end portion on an aperture portion side of the bottom surface portion.

8. The resilient stopper component according to claim 7, wherein a groove that extends in a transverse direction of the aperture portion, is formed in a bottom surface of the projecting portion.

* * * * *